United States Patent
Billapati et al.

(10) Patent No.: US 12,497,067 B2
(45) Date of Patent: Dec. 16, 2025

(54) AUTONOMOUS PARKING AND SUMMONING OPERATIONS IN LOCATIONS WITHOUT CELLULAR COMMUNICATION COVERAGE

(71) Applicant: Aptiv Technologies AG, Schaffhausen (CH)

(72) Inventors: Rajashekar Reddy Billapati, Noblesville, IN (US); Kanishka Tyagi, Thousand Oaks, CA (US); Sruthi Kilari, Noblesville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 163 days.

(21) Appl. No.: 18/331,141

(22) Filed: Jun. 7, 2023

(65) Prior Publication Data

US 2024/0409115 A1    Dec. 12, 2024

(51) Int. Cl.
*B60W 60/00* (2020.01)
*B60W 30/06* (2006.01)
(Continued)

(52) U.S. Cl.
CPC .......... *B60W 60/001* (2020.02); *B60W 30/06* (2013.01); *B60W 40/02* (2013.01);
(Continued)

(58) Field of Classification Search
None
See application file for complete search history.

(56) References Cited

U.S. PATENT DOCUMENTS 9,377,315 B2    6/2016    Grover et al.
2017/0120906 A1*   5/2017    Penilla ............... G01C 21/3407
(Continued)

FOREIGN PATENT DOCUMENTS

WO    2018166579 A1    9/2018
WO    2022043498 A1    3/2022
WO    2023044721 A1    3/2023

OTHER PUBLICATIONS

Mustapha Boushaba et al: "Reinforcement learning-based best path tobest gateway scheme for wireless mesh networks", Wireless and Mobile Computing, Networking and Communications (WIMOB), 2011 IEEE 7th International Conference on, IEEE, Oct. 10, 2011 (Oct. 10, 2011), pp. 373-379, XP032000193, DOI: 10.1109/WIMOB. 2011.6085373 ISBN: 978-1-4577-2013-0.
(Continued)

*Primary Examiner* — Madison R. Inserra
(74) *Attorney, Agent, or Firm* — Harness, Dickey & Pierce, P.L.C.

(57) ABSTRACT

This document describes techniques and systems for autonomous parking in locations without cellular coverage. A system can include a processor that obtains a request to autonomously park in a parking environment. The system can then determine whether parking space information indicating an available space was obtained. In response to determining that parking space information was obtained, the system can autonomously operate the host vehicle to navigate to and park in the available space. The system determines whether a communication system of the host vehicle has a cellular connection available to aid in the navigation. In response to a determination that the cellular connection is not available, the system communicates the location of the host vehicle to the processor via a proxy vehicle with an operable cellular connection. By utilizing a mesh network among vehicles to share their cellular con-
(Continued)

nections, autonomous parking features may remain available in locations without cellular coverage.

15 Claims, 6 Drawing Sheets

(51) Int. Cl.
*B60W 40/02* (2006.01)
*H04W 84/18* (2009.01)

(52) U.S. Cl.
CPC ..... *B60W 2530/00* (2013.01); *B60W 2556/65* (2020.02); *H04W 84/18* (2013.01)

(56) References Cited

U.S. PATENT DOCUMENTS

| | | | |
|---|---|---|---|
| 2019/0118801 A1* | 4/2019 | Noh | B60W 30/095 |
| 2020/0334985 A1 | 10/2020 | Zhou et al. | |
| 2022/0258726 A1* | 8/2022 | Okubo | G08G 1/205 |
| 2022/0341744 A1* | 10/2022 | Zhang | G06Q 50/40 |
| 2024/0059298 A1* | 2/2024 | MacDonald | B60W 40/09 |

OTHER PUBLICATIONS

European Search Report regarding Application No. 23183506.7, mailed Dec. 7, 2023.

\* cited by examiner

AUTONOMOUS PARKING AND SUMMONING OPERATIONS IN LOCATIONS WITHOUT CELLULAR COMMUNICATION COVERAGE

BACKGROUND

Some vehicles provide autonomous parking operations (e.g., automated valet parking and summoning) to assist drivers. Autonomous parking generally involves a vehicle arriving at a drop-off area (e.g., a designated unloading area), the driver exiting the vehicle, the vehicle autonomously driving to a parking space, and, later, the driver remotely summoning the vehicle to a pickup area (e.g., a designated loading area). To share the vehicle's parking location or to summon the vehicle, autonomous parking systems generally require a cellular connection to communicate with an application on the driver's smartphone. Cellular coverage, however, is not ubiquitous in many parking environments (e.g., underground parking structures, large parking garages, or remote parking areas), and thus the vehicle may not be able complete one or more aspects of autonomous parking.

SUMMARY

This document describes techniques and systems for autonomous parking and summoning in locations without cellular communication coverage. In one example, a system includes a processor that can obtain from a driver of a host vehicle a request to autonomously park the host vehicle in a parking environment. The system can then determine whether parking space information indicating an available space in the parking environment was obtained. In response to determining that parking space information was obtained, the system can autonomously operate the host vehicle in the parking environment to navigate to the available space and autonomously park the host vehicle therein. The system can then determine whether a communication system of the host vehicle has a cellular connection available. In response to a determination that the cellular connection is not available, the system communicates the location of the host vehicle to the driver via a proxy vehicle with a cellular connection. At a later time, the system can receive a summons request via the proxy vehicle and autonomously operate the host vehicle to navigate to a pickup area. In this way, autonomous parking and summoning features may remain available to a driver in parking garages and other locations without cellular communication coverage by utilizing a mesh network among vehicles to identify and share a cellular connection.

This document also describes methods performed by the above-summarized system and other configurations of the system set forth herein and means for performing these methods.

This Summary introduces simplified concepts related to autonomous parking and summoning operations in locations without cellular communication coverage, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques enabling autonomous parking and summoning operations in locations without cellular communication coverage are described with reference to the following drawings. The same numbers are used throughout the drawings to reference like features and components.

DETAILED DESCRIPTION

Overview

As described above, some vehicles provide autonomous parking functionalities to assist drivers. To share the vehicle's parking location or to summon the vehicle, autonomous parking systems generally require a cellular connection to communicate with an application on the driver's smartphone. Cellular communications, however, may not be available in many parking environments (e.g., underground parking structures, large parking garages, or remote parking areas), and thus autonomous parking or summoning may not be available in such environments.

For non-cellular environments, some systems may require the driver to be close enough to communicate using a short-range communication protocol (e.g., Bluetooth). Other systems may require the driver to remain in the vehicle during the parking operation and may not be able to provide a summons feature in such environments. Such systems cannot provide a full suite of autonomous-parking features in environments without cellular communication coverage (e.g., parking garages).

This document describes methods and systems for autonomous parking and summoning operations in locations without cellular communication coverage. In an example implementation, a system of the host vehicle may initially obtain a request to autonomously park in a parking environment. The system may then determine whether parking space information indicating an available space was obtained. In response to determining that parking space information was obtained, the system may autonomously operate the host vehicle in the parking environment to navigate to the available space and autonomously park therein. The system may then determine whether a communication system of the host vehicle has a cellular connection available. In response to a determination that the cellular connection is not available, the system communicates the location of the host vehicle to the driver via a proxy vehicle with a cellular connection. At a later time, the system may receive a summons request via the proxy vehicle or another proxy vehicle that has a cellular connection and autonomously operates the host vehicle to navigate to a pickup area. In this way, autonomous parking and summoning operations may remain available to a driver in parking garages and other locations without cellular communication coverage by utilizing a mesh network among vehicles to identify and share a cellular connection.

Example Environment

Figure 1:
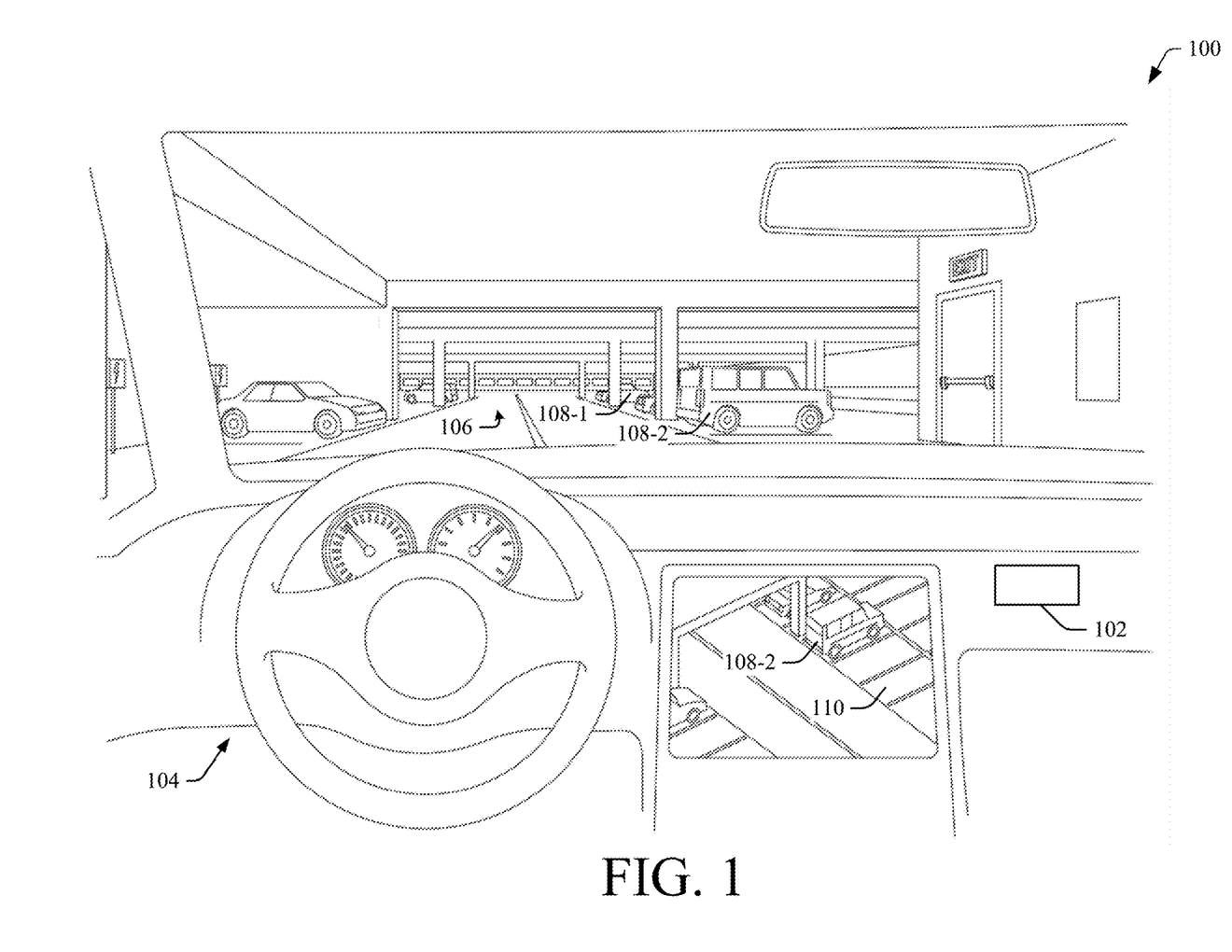
FIG. 1 is an example illustration of an environment in which autonomous parking and summoning operations in locations without cellular communication coverage may be implemented, in accordance with techniques of this disclosure.

FIG. 1 is an example illustration of an environment 100 in which autonomous parking and summoning operations locations without cellular communication coverage may be implemented. In example environment 100, an autonomous parking system 102 is located in or on a host vehicle 104. In particular, the host vehicle 104 may navigate the environment 100 to complete an autonomous parking operation (e.g., parking the host vehicle 104 in an available space or completing a summons request). The host vehicle 104 is autonomously traveling or about to autonomously operate along roadway 106 in a parking garage or other environment without cellular communication coverage. In the depicted implementation, the host vehicle 104 is navigating to an available space 110 using an automated parking valet feature.

The autonomous parking system 102 can use one or more sensors (not shown) of the host vehicle 104 to navigate roadway 106 within environment 100 and park in the available space 110. The autonomous parking system 102 may utilize one or more communication systems (not shown) to obtain a location of the available space 110 from other vehicles 108 (e.g., a first other vehicle 108-1 and a second other vehicle 108-2) in the environment 100. The autonomous parking system 102 may communicate with the other vehicles 108 (e.g., the first other vehicle 108-1) directly using a non-cellular communication protocol (e.g., Bluetooth® or other short-range communication protocols). The autonomous parking system 102 may also indirectly communicate with the other vehicles (e.g., the second other vehicle 108-2) by forming a network (e.g., a mesh network, another type of network) with the other vehicles 108 using the non-cellular communication protocol. In this way, the autonomous parking system 102 may identify the available space 110 in a battery-efficient manner without having to autonomously navigate the environment 100 to identify the available space 110. In other implementations, the autonomous parking system 102 may obtain the location of the available space 110 from infrastructure equipment (e.g., a remote camera) connected to the same or different network shared with other vehicles. Infrastructure equipment within the environment 100 can share information similar to another vehicle, using a non-cellular communication protocol. In yet other implementations, the autonomous parking system 102 may autonomously navigate the environment 100 to identify the available space 110 if the host vehicle 104 has a sufficient battery power level (assuming the host vehicle 104 is an electric vehicle).

The autonomous parking system 102 may also send a pose or position request to the other vehicles 108 or remote infrastructure equipment. In response to the pose request, the autonomous parking system 102 may receive a corrected pose of the host vehicle 104 from the other vehicles 108 or remote infrastructure equipment. The updated pose may be used to autonomously navigate or begin navigation of the environment 100 based on a reference map generated by the autonomous parking system 102 or a remote system (not shown) for the environment 100.

Figure 2:
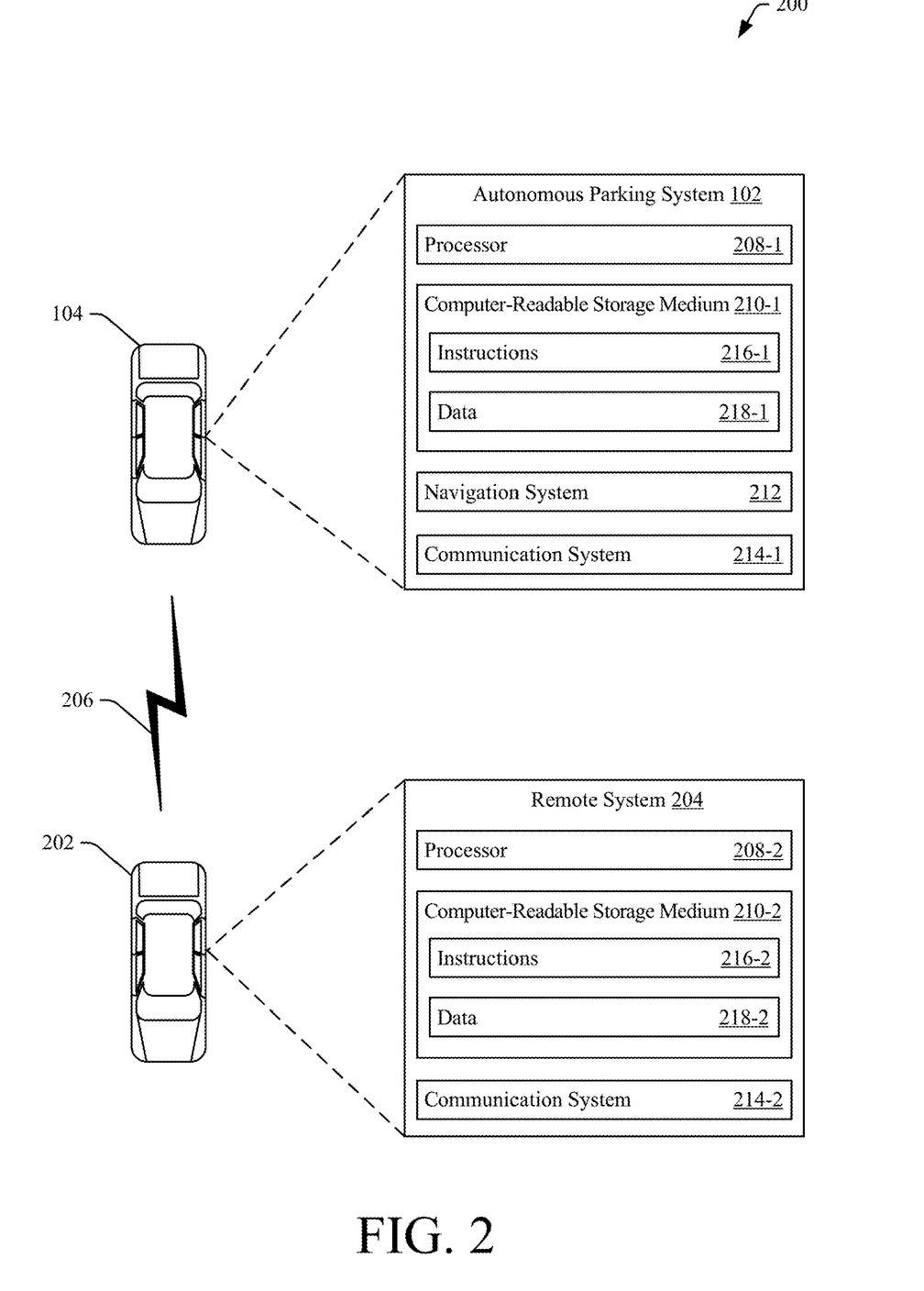
FIG. 2 is an example illustration of systems that may be used to implement autonomous parking and summoning operations in locations without cellular communication coverage, in accordance with techniques of this disclosure.

FIG. 2 is an example illustration 200 of systems that may be used to implement autonomous parking and summoning operations in parking garages and other locations without cellular communication coverage. Example illustration 200 comprises the autonomous parking system 102 of the host vehicle 104 and a remote system 204 of another vehicle 202. The other vehicle 202 can, for example, be the other vehicle 108-1 or 108-2 of FIG. 1 within the environment 100. Although the host vehicle 104 and the other vehicle 202 are illustrated as a car, the host vehicle 104 and the other vehicle 202 may be any vehicle (e.g., a truck, a bus, a boat, a plane) without departing from the scope of this disclosure.

The autonomous parking system 102 and the remote system 204 may be connected via a wireless link 206. Although the remote system 204 is illustrated as part of the other vehicle 202, the remote system 204 can be located in a separate, remote computer system (e.g., in the cloud) to process image or video data from the other vehicle 202 and communicate the parking space information or summons request to the autonomous parking system 102 via the wireless link 206 or another wireless link (not illustrated) in other embodiments. The wireless link 206 utilizes a non-cellular communication protocol (e.g., Bluetooth® (a short-range wireless communication technology), WI FI® (a wireless networking technology that uses radio waves to provide wireless communication), wireless local area network, Dedicated Short Range Communication (DSRC), Vehicle-to-Vehicle (V2V), ZIGBEE® (a wireless communication protocol based on the IEEE 802.15.4 standard), or Z-WAVE® (a wireless communication protocol configured for various devices including smart devices). The wireless link 206 can be a direct connection between two vehicles or a connection routed through the network (e.g., through one or more vehicle or infrastructure intermediaries).

As illustrated in FIG. 2, the autonomous parking system 102 and the remote system 204 each include at least one processor 208 (e.g., processor 208-1 and processor 208-2, respectively), at least one non-transitory computer-readable storage medium 210 (e.g., computer-readable storage medium 210-1 and 210-2, respectively), and communication systems 214 (e.g., communication system 214-1 and 214-2, respectively).

The autonomous parking system 102 or the host vehicle 104 also includes one or more sensors (not illustrated) that may include cameras, radar systems, ultrasonic sensors, and/or lidar systems. The autonomous parking system 102 can provide the sensor data to a localization module and/or a navigation system 212 of the host vehicle 104. For example, the localization module can use sensor data to determine an estimated pose of the host vehicle 104. The localization module may include a geospatial positioning system (e.g., a global positioning system (GPS), global navigation satellite system (GNSS or GLONASS) sensor), an inertial measurement system (e.g., a gyroscope or accelerometer), or other sensors (e.g., a magnetometer, software positioning engine, wheel tick sensor, lidar odometer, vision odometer, radar odometer, or other sensor odometers).

The navigation system 212 can use sensor data and the pose of the host vehicle 104 to navigate the parking environment to the desired location (e.g., an available space or a pick-up area). The navigation system 212 can use pose data from the localization module and/or sensor data from the sensors to navigate the host vehicle 104 along roadways and within parking environments. For example, the navigation system 212 can navigate the host vehicle 104 from a drop-off area to an available space for an autonomous parking operation.

The navigation system 212 (or portions thereof) may be located within the computer-readable storage media 210-1 or be stand-alone components (e.g., executed in dedicated hardware in communication with the processor 208-1 and computer-readable storage medium 210-1). For example, instructions 216-1 may cause the processor 208-1 to implement or otherwise cause the autonomous parking system 102 to implement the techniques described herein.

The remote system 204 can process images, videos, or other sensor data of the parking environment and identify one or more available spaces in the parking environment. For example, the remote system 204 can process an image captured by a camera of the other vehicle 202 and determine one or more parking spaces that are unoccupied. The remote system 204 may then communicate, using wireless link 206, the location of the one or more available spaces to the autonomous parking system 102.

The communication systems 214 facilitate the exchange of data, including a request for parking space information, an identification of available spaces, a summons request, and/or other information (e.g., regarding the parking environment) over the wireless link 206. The communication systems 214 can, for example, include hardware, software, and/or firmware required to communicate via Bluetooth®, Wi-Fi, wireless local access network (WLAN), DSRC. Vehicle-to-Everything (V2X), V2V, Zigbee, or Z-Wave communication protocols.

The processors 208 (e.g., application processors, microprocessors, digital signal processors (DSP), or controllers) are configured to execute computer-executable instructions 216 (e.g., instructions 216-1 and 216-2) stored within the computer-readable storage media 210 (e.g., non-transitory storage devices such as hard drives, solid-state drives (SSD), flash memories, read-only memories (ROM), erasable programmable ROM (EPROM), or electrically erasable programmable ROM (EEPROM)) to cause the autonomous parking system 102 and remote system 204 to perform the techniques described herein. The instructions 216 may be part of operating systems and/or one or more applications of the autonomous parking system 102 and remote system 204.

The instructions 216 cause the autonomous parking system 102 and the remote system 204 to act upon (e.g., create, receive, modify, delete, transmit, or display) data 218 (e.g., data 218-1 and 218-2). Data 218 may comprise application data, module data, sensor data, or input/output (I/O) data. The data 218 may also include a reference map for the parking environment, a location of available spaces, a position of the host vehicle 104, or a summons request. Although shown within the computer-readable storage media 210, portions of the data 218 may be within random-access memories (RAM) or caches of the autonomous parking system 102 and the remote system 204 (not shown). Furthermore, the instructions 216 and/or the data 218 may be remote to the autonomous parking system 102 and the remote system 204.

Figure 3:
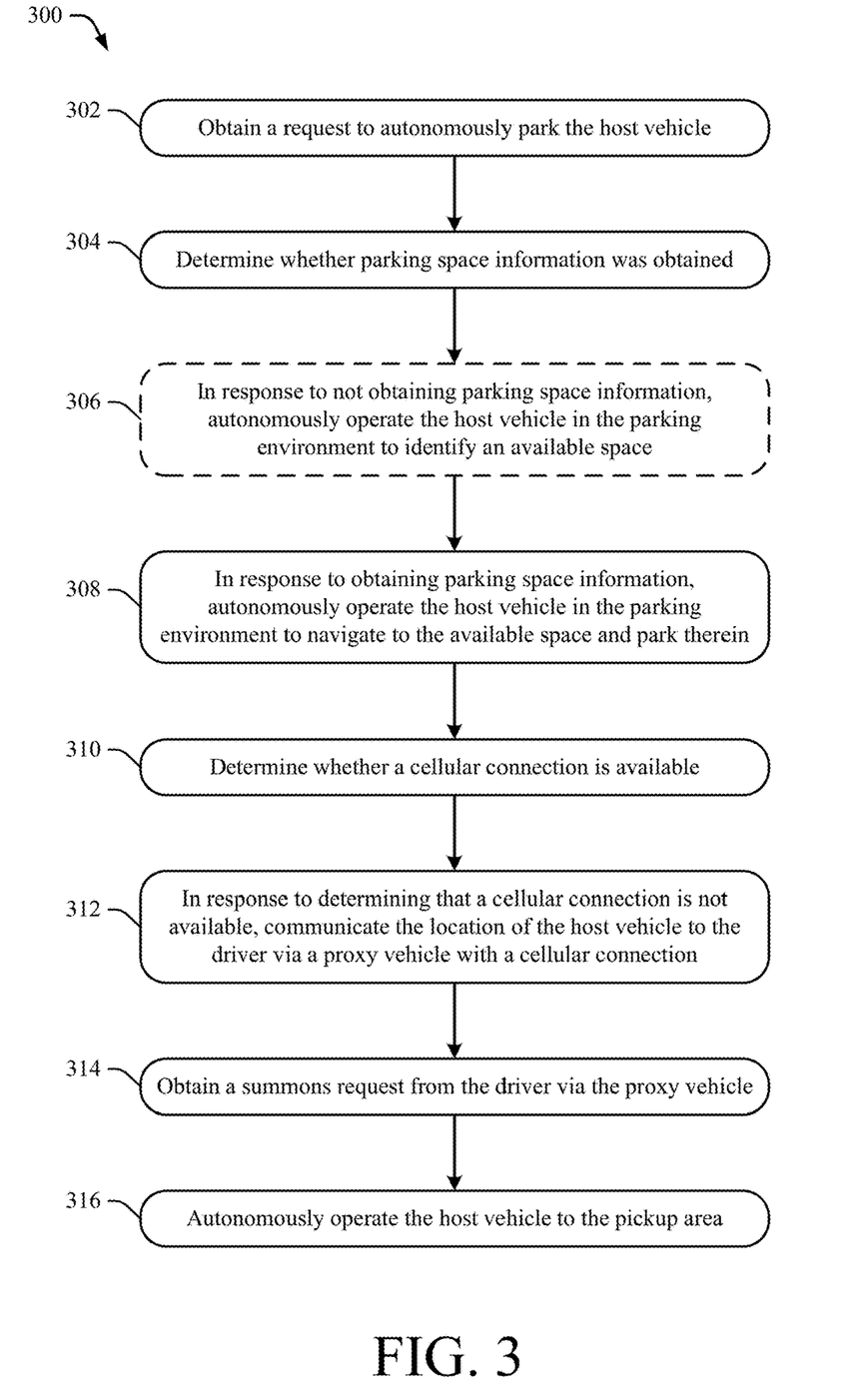
FIG. 3 illustrates an example method to perform autonomous parking and summoning operations in locations without cellular communication coverage.

FIG. 3 illustrates an example method 300 to perform autonomous parking and summoning operations in locations without cellular communication coverage. Method 300 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to environment 100 of FIG. 1, and entities detailed in FIGS. 1 and 2, reference to which is made for example only. The techniques are not limited to performance by one entity or multiple entities. For example, the system can be the autonomous parking system 102 of FIGS. 1 and 2.

At step 302, a request to autonomously park a host vehicle in a parking environment is obtained from the driver of the host vehicle. For example, the autonomous parking system 102 receives a request to autonomously park the host vehicle 104 in environment 100. As described above, the environment 100 has limited cellular communication coverage. The request may be received via driver input on a display in the host vehicle 104 or via input by the driver within an application installed on a mobile device of the driver. The mobile device may be connected to the autonomous parking system 102 via a short-range communication protocol (e.g., Bluetooth®, Wi-Fi, wireless local area network, Dedicated Short Range Communication (DSRC), Vehicle-to-Vehicle (V2V), Zigbee, or Z-Wave).

At step 304, it is determined whether parking space information was obtained. The parking space information indicates an available space in the parking environment, including a location of the available space. For example, the autonomous parking system 102 determines whether parking space information was obtained from another vehicle or an infrastructure device in the environment 100. As described in greater detail below, the parking space information may be obtained from vehicle 108-1 directly using a short-range communication protocol or indirectly via a mesh network.

At optional step 306, in response to determining that available parking space information was not obtained, the host vehicle is autonomously operated in the parking environment to identify an available parking space. For example, the autonomous parking system 102 may autonomously operate the host vehicle 104 in the environment 100 to obtain the parking space information, including an available space 110, upon determining that the parking space information was not obtained from another vehicle or infrastructure devices. The available space 110 may be identified using data from sensors installed on the host vehicle 104.

At step 308, in response to determining that the parking space information was obtained, the host vehicle is autonomously operated in the parking environment to navigate to the available space and autonomously park therein. For example, the autonomous parking system 102 autonomously operates the host vehicle 104 in the environment 100 to navigate to the available space 110 and autonomously park the host vehicle 104 in the available space 110.

At step 310, it is determined whether a cellular connection is available to a communication system of the host vehicle. For example, the autonomous parking system 102 determines whether a cellular communication connection is available to the communication system 214-1 of the host vehicle 104.

At step 312, in response to determining that the cellular connection is not available, a location of the host vehicle is communicated to the driver via a proxy vehicle with a cellular connection. For example, the autonomous parking system 102 establishes a mesh network with a proxy vehicle within the environment 100 that has a cellular connection in response to determining that a cellular connection is not available to the communication system 214-1. The autonomous parking system 102 sends the parked location of the host vehicle 104 to the driver via the proxy vehicle.

The autonomous parking system 102 may form the network by connecting with a first other vehicle (e.g., the vehicle 108-1) in the environment 100 using a short-range communication protocol. The communication protocol may include at least one of a Bluetooth®, a wireless local area network, Dedicated Short Range Communication (DSRC), Vehicle-to-Vehicle (V2V), Zigbee, Z-Wave, or another short-range communication protocol. In response to determining that the first other vehicle has a cellular connection, the autonomous parking system 102 identifies the first other vehicle as the proxy vehicle.

Alternatively, in response to determining that the first other vehicle does not have a cellular connection, the autonomous parking system 102 connects with a second other vehicle (e.g., the vehicle 108-2) using the same communication protocol or another short-range communication protocol. The host vehicle 104 and the other vehicles may be manufactured by different manufacturers, which may necessitate the use of different communication protocols. The connection with the second other vehicle may be either direct or indirect via the first other vehicle. In response to determining that the second other vehicle has a cellular connection, the autonomous parking system 102 identifies the second other vehicle as the proxy vehicle. Otherwise, the autonomous parking system 102 continues to expand the mesh network until a vehicle with a cellular connection is identified and may be used as a proxy vehicle to send and receive information related to autonomous parking operations. The autonomous parking system 102 can use a machine-learned algorithm to identify the shortest connection path between the host vehicle 104 and the proxy vehicle within the mesh network.

While the host vehicle 104 is connected to the mesh network, the autonomous parking system 102 may assess the battery power level. In response to determining that the host vehicle 104 is in a low-power battery condition, the autonomous parking system 102 may disconnect the host vehicle 104 from the mesh network to conserve battery power. Prior to disconnecting from the mesh network, the autonomous parking system 102 sends the parked location of the host vehicle 104 (e.g., obtained via a GPS signal, a response to a pose request, dead reckoning, or some other localization process) to the driver via the proxy vehicle.

At step 314, after communicating the location of the host vehicle to the driver, a summons request is obtained from the driver via the proxy vehicle or another proxy vehicle. The summons request instructs the host vehicle to navigate from the available space to a pickup area in or near the parking environment. For example, while the host vehicle 104 is connected to the mesh network, the autonomous parking system 102 may receive a summons request from the driver via the proxy vehicle or another proxy vehicle (e.g., after an initial proxy vehicle left the environment 100 or disconnected from the mesh network). In response to obtaining the summons request and before autonomously operating the host vehicle, the autonomous parking system 102 may determine whether the host vehicle 104 is in a low-power battery condition. If a low-power battery condition exists, the autonomous parking system 102 may communicate, via the proxy vehicle, the parking location of the host vehicle 104 to the driver and decline or reject the summons request in order to conserve battery power and allow the driver to navigate to a charging station.

At step 316, in response to obtaining the summons request, the host vehicle is autonomously operated from the available space to the pickup area. For example, the autonomous parking system 102 may autonomously operate the host vehicle 104 from the available space 110 to the pickup area in response to obtaining the summons request. In this way, the autonomous parking system 102 may perform autonomous parking operations (e.g., identifying the available space 110, relaying the parked location of the host vehicle 104, and receiving a summons request) even when the host vehicle 104 does not have access to a cellular communication connection within the parking environment using a mesh network with other vehicles in or near the parking environment.

Figure 4:
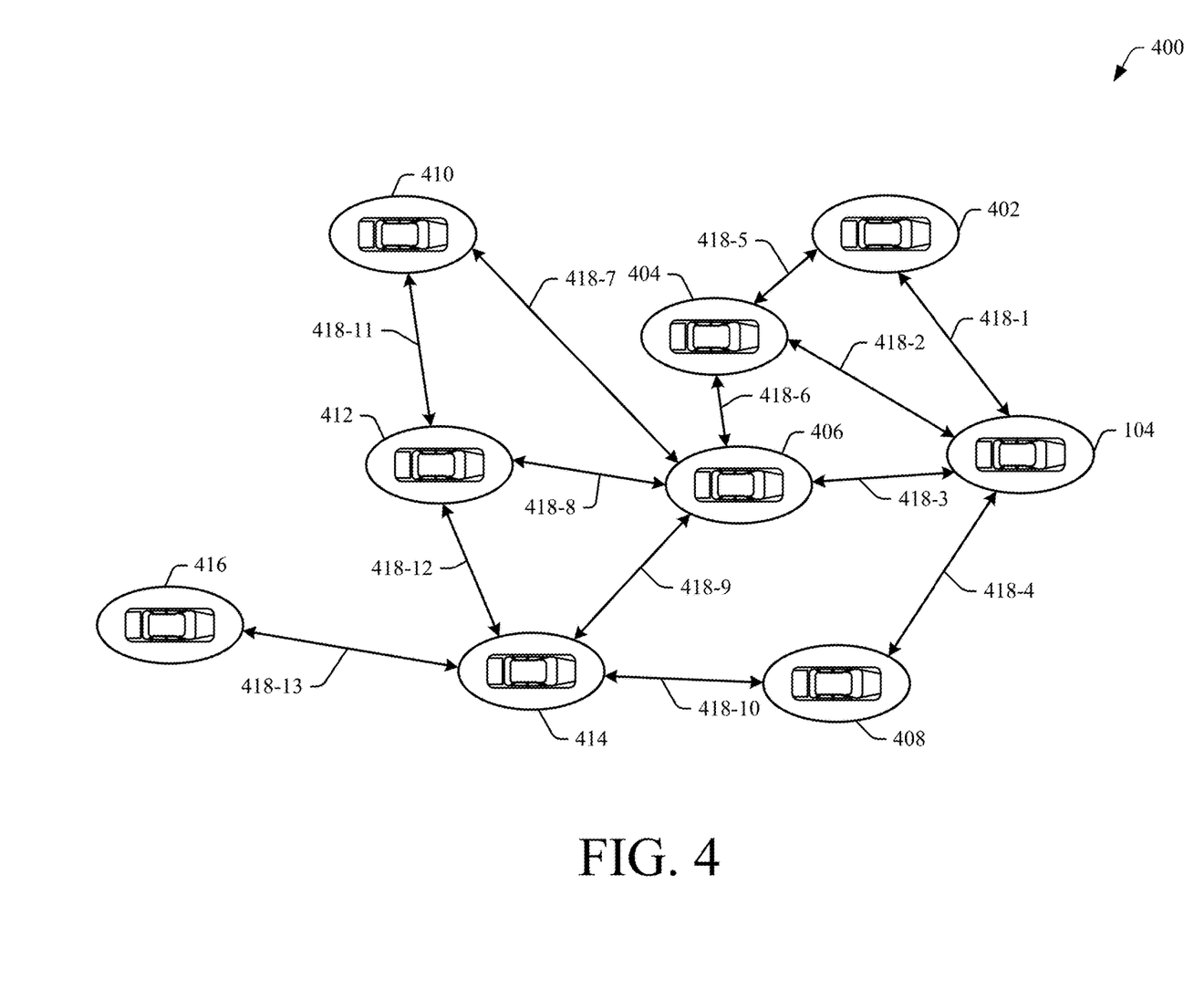
FIG. 4 is an example illustration of a mesh network among vehicles to facilitate autonomous parking and summoning operations in locations without cellular communication coverage, in accordance with techniques of this disclosure.

FIG. 4 is an example illustration of a mesh network 400 among vehicles to facilitate autonomous parking and summoning operations in locations without cellular communication coverage. In the example mesh network 400, the host vehicle 104 is located in a parking environment that generally does not have cellular communication coverage (e.g., a parking garage), but certain areas of the parking environment (e.g., a level near ground level or the outside edges of the parking environment) may have cellular communication coverage. Nearby in the parking environment are a number of other vehicles, including a vehicle 402, a vehicle 404, a vehicle 406, a vehicle 408, a vehicle 410, a vehicle 412, a vehicle 414, and a vehicle 416. The host vehicle 104 and vehicles 402 through 416 may be manufactured by the same original equipment manufacturer (OEM) or different OEMs.

Using the communication systems 214 of the host vehicle 104 and the other vehicles 402 through 416, the host vehicle 104 can form the mesh network 400 to find a vehicle with a cellular connection and share data related autonomous parking among each other (e.g., a summons request, a parked location, or available space information). In this example, vehicle 416 may be located at a periphery of the parking environment or on a parking level near the ground floor and has a cellular communication connection. Because the vehicle 416 has a cellular connection, the vehicle 416 may act as a proxy vehicle for the other vehicles in the mesh network 400. For this document, a proxy vehicle is considered as a vehicle with a cellular network connection, sufficient battery life to maintain communications over the mesh network 400, and/or within the range of the host vehicle 104 or another vehicle within the mesh network 400.

As described above, the communication systems 214 facilitate the exchange of data, including a request for parking space information, an identification of available spaces, a summons request, and/or other information (e.g., regarding the parking environment) over wireless links 418. The wireless links 418 may be secure links.

In an automated parking mode, the host vehicle 104 may continuously check its cellular connection status. If it has a weak connection or no cellular connection, then the host vehicle 104 may search for a proxy vehicle to facilitate communication with the driver (e.g., to receive a summons request or to relay its parking location). In the example of mesh network 400, the host vehicle 104 may first search for other vehicles within its range that may act as a proxy vehicle. For example, the host vehicle 104 may establish a wireless link 418-1 with the vehicle 402, a wireless link 418-2 with the vehicle 404, a wireless link 418-3 with the vehicle 406, and a wireless link 418-4 with the vehicle 408.

If none of these vehicles have a cellular connection, then these vehicles (e.g., vehicles 402, 404, 406, and 408) may search or have already searched for other vehicles within their communication range to find a proxy vehicle. For example, the vehicle 402 may also establish a wireless link 418-5 with the vehicle 404. Similarly, vehicle 404 may also establish a wireless link 418-6 with vehicle 406. The vehicle 406 may also establish a wireless link 418-7 with the vehicle 410, a wireless link 418-8 with the vehicle 412, and a wireless link 418-9 with the vehicle 414. The vehicle 408 may also establish a wireless link 418-10 with the vehicle 414.

If none of these vehicles have a cellular connection, then the mesh network 400 will continue to expand until a vehicle with a cellular connection is found. For example, the vehicle 410 may also establish a wireless link 418-11 with the vehicle 412. Lastly, the vehicle 414 may also establish a wireless link 418-12 with the vehicle 412 and a wireless link 418-13 with the vehicle 416. In particular, the host vehicle 104 finds the proxy vehicle (e.g., the vehicle 416) via vehicle 408 and vehicle 414.

If the proxy vehicle leaves the parking environment or otherwise drops out of the mesh network 400, the host vehicle 104 or other vehicles within the parking environment may initiate additional mesh network connections to find another vehicle with a cellular connection to act as a proxy vehicle. If the proxy vehicle is about to leave the parking environment or otherwise disconnect from the mesh network 400, the proxy vehicle can send a signal or alert to the vehicles, including the host vehicle 104, that it can no longer act as the proxy vehicle for the mesh network 400. In response to receiving such a signal or alert from the proxy vehicle, the host vehicle 104 or other vehicles within the parking environment may initiate additional mesh network connections to find another vehicle with a cellular connection to act as a proxy vehicle.

The communication systems 214 may use a machine-learning (ML) algorithm to improve the mesh network 400 and find the shortest communication path among the vehicles from the host vehicle 104 to the proxy vehicle (e.g., vehicle 416). The ML algorithm can efficiently find the shortest communication path to the proxy vehicle and minimize battery consumption to maintain the mesh network 400. In addition, because ML algorithms are generally highly efficient, the mesh network 400 may be maintained even if the host vehicle 104 is in a low-power mode (e.g., a sleep or hibernate state).

In some implementations, the host vehicle 104 may broadcast a signal via the communication system 214-1 to identify a proxy vehicle. If more than one vehicle responds with an acknowledgment of the pinged signal and indicates that it has a cellular connection, then the communication system 214-1 may use a selection algorithm to decide on which vehicle to use as the proxy vehicle. For example, the selection algorithm may consider the distance between the host vehicle 104 and the responding vehicle, battery level, and power consumption for different connectivity protocols (e.g., assuming that the responding vehicles respond using different communication protocols). Different communication protocols have different range capabilities and different power usage. As a result, the selection algorithm may be used by the communication system 214-1 or a ML algorithm thereof to optimize between a distance parameter (among the vehicles) and power usage. The selection algorithm may also optimize the number of connection points between the host vehicle 104 and the proxy vehicle (e.g., fewest number of intermediate vehicles in the connection between the host vehicle 104 and the proxy vehicle), the communication protocol, the strongest signal connection path between the host vehicle 104 and the proxy vehicle, or some other measure of the connections within the mesh network 400. The selection algorithm also allows the host vehicle 104 to send out multiple pings at once instead of sending out individual pings one at a time to nearby vehicles.

The host vehicle 104 may utilize the mesh network 400 to receive a summons request from the driver. In particular, the proxy vehicle (e.g., vehicle 416) may receive the summons request via its cellular network connection. The proxy vehicle may then relay the summons request to the host vehicle 104 via vehicles 414 and 408. In this way, the host vehicle 104 may act on a summons request even without a cellular communication connection and provide this autonomous parking feature. For example, the host vehicle 104 may exit a low-power mode and autonomously navigate to a designated location. If the host vehicle 104, however, is in a critically low-power mode, instead of performing the autonomous driving operations, the host vehicle 104 may communicate its location (e.g., obtained via a GPS signal or dead reckoning) thru the mesh network 400 to the driver and alert the driver of the battery condition. The driver may then identify a nearby charging station and operate the host vehicle 104 to the charging station.

Figure 5:
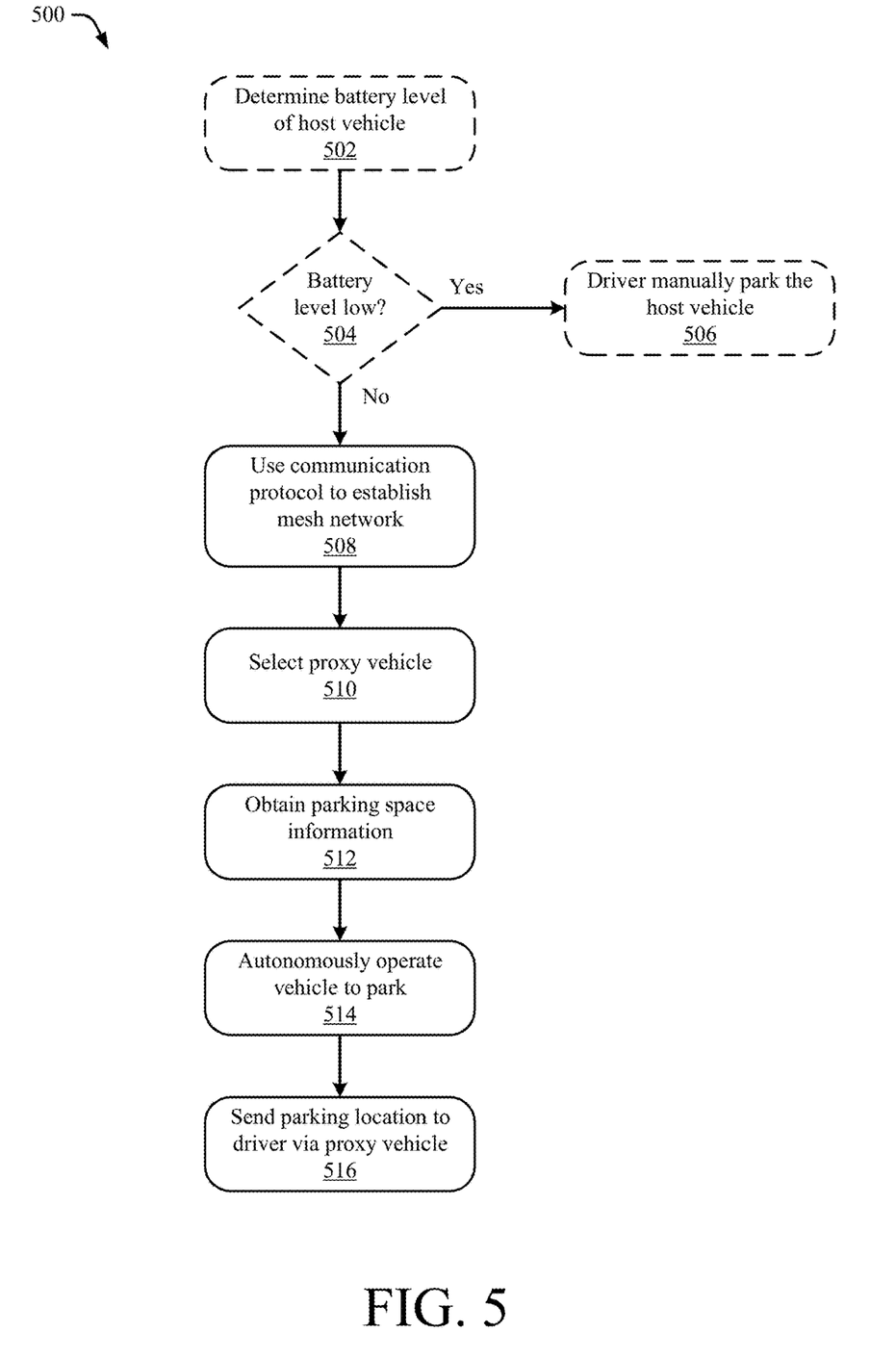
FIG. 5 illustrates an example flow chart of autonomous parking in locations without cellular communication coverage, in accordance with techniques of this disclosure.

FIG. 5 illustrates an example flow chart 500 of autonomously parking a host vehicle (e.g., the host vehicle 104) in locations without cellular communication coverage. Flow chart 500 may be performed by the autonomous parking system 102 of the host vehicle 104. Flow chart 500 may include additional or fewer operations or be performed in a different order.

At optional step 502, in response to receiving a request to autonomously park the host vehicle 104, the autonomous parking system 102 determines the battery level of the host vehicle 104. Step 502 assumes that the host vehicle 104 is an electric vehicle. If the host vehicle 104 is not an electric vehicle, then the autonomous parking system 102 may proceed to step 508.

At optional step 504, the autonomous parking system 102 determines whether the battery level is low. At optional step 506 and in response to the battery level being low, the autonomous parking system 102 instructs the driver to manually park the host vehicle 104 in the parking environment. Autonomous operation of the host vehicle 104 may consume a significant amount of battery power and so the autonomous parking system 102 declines the autonomous parking request to preserve the battery level. Alternatively, the autonomous parking system 102 may navigate the host vehicle 104 to park at an available charging station within the parking environment.

At step 508, and optionally in response to the battery level not being low, the autonomous parking system 102 uses a communication protocol to establish a mesh network with one or more other vehicles in the parking environment. For example, the autonomous parking system 102 may establish the mesh network 400 with the vehicles 402 through 416. In some implementations, the driver may override steps 502 through 506 and proceed to step 508 (e.g., if EV charging is available in the parking environment or nearby). As part of step 508, the communication system 214-1 may iteratively check each short-range communication protocol (e.g., Bluetooth®, Wi-Fi, wireless local area network, Dedicated Short Range Communication (DSRC), Vehicle-to-Vehicle (V2V), Zigbee, or Z-Wave) to establish a link with another vehicle as part of forming the mesh network 400.

At step 510, the autonomous parking system 102 selects a proxy vehicle (e.g., the vehicle 416) among the vehicle 402 through 416 in the mesh network 400. As described above, the proxy vehicle has a cellular connection and can send and receive messages for the host vehicle as part of providing autonomous parking operations to the driver.

At step 512, the autonomous parking system 102 obtains parking space information from another vehicle in the mesh network 400. The parking space information includes the location of one or more available spaces. In other implementations, the autonomous parking system 102 may obtain the parking space information from infrastructure devices in the parking environment. In yet other implementations, the autonomous parking system 102 may autonomously operate the host vehicle 104 in the parking environment to identify an available space.

At step 514, in response to obtaining parking space information, the autonomous parking system 102 autonomously operates the host vehicle 104 in the parking environment to navigate to and park in the available space.

At step 516, the autonomous parking system 102 sends, via the proxy vehicle within the mesh network 400, the parking location of the host vehicle 104 to the driver (e.g., an application installed on a mobile device of the driver). In this way, the autonomous parking system 102 may autonomously park the host vehicle 104 in an efficient manner even without a cellular connection.

Figure 6:
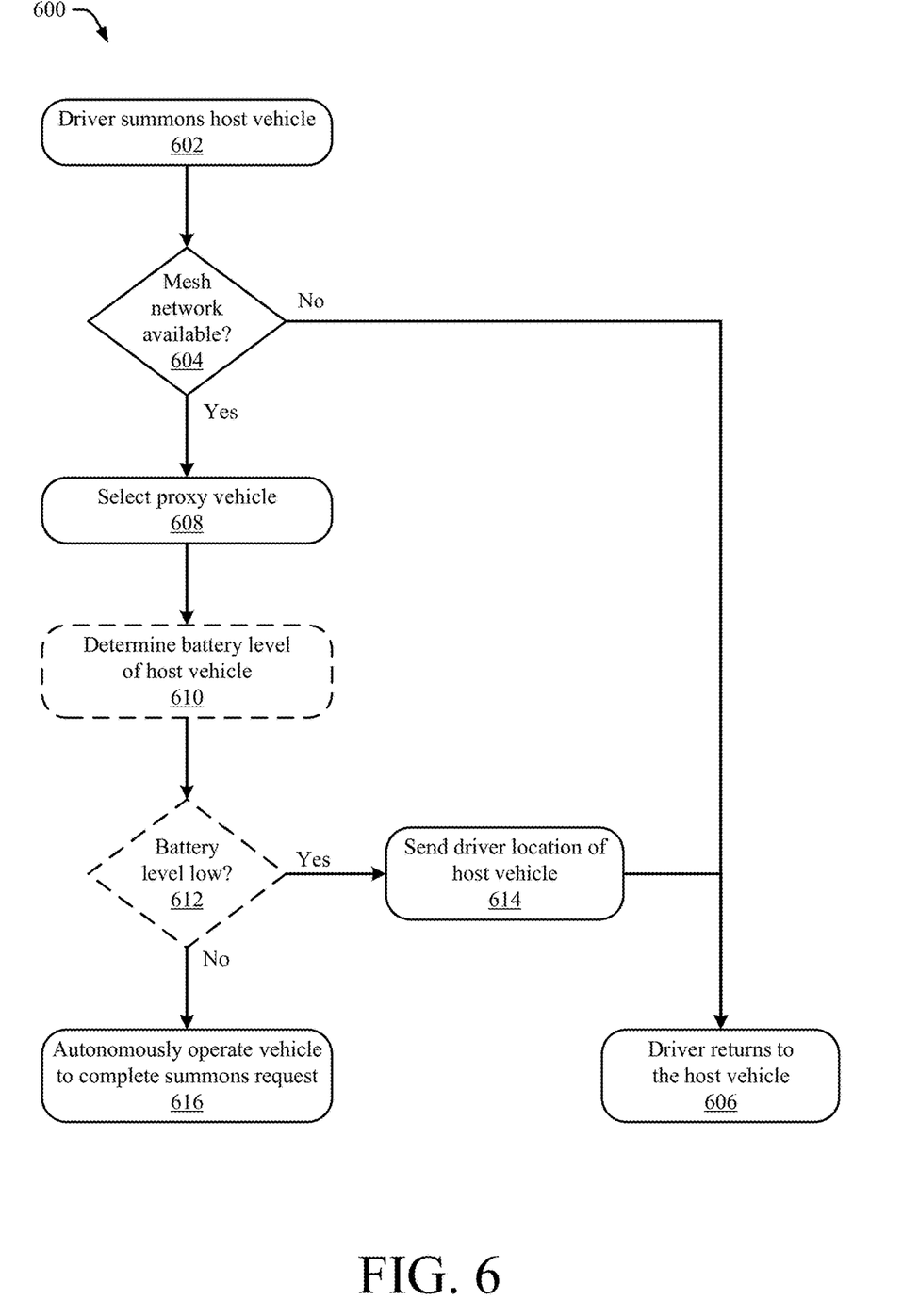
FIG. 6 illustrates an example flow chart of fulfilling a summons request as part of autonomous parking operations in locations without cellular communication coverage, in accordance with techniques of this disclosure.

FIG. 6 illustrates an example flow chart 600 of fulfilling a summons request as part of autonomous parking operations in locations without cellular communication coverage. Flow chart 600 may be performed by the autonomous parking system 102 of the host vehicle 104. Flow chart 600 may include additional or fewer operations or be performed in a different order.

At step 602, the driver summons the host vehicle 104. The driver may summon the host vehicle via an application on their mobile device.

At step 604, the autonomous parking system 102 determines whether a mesh network is available. For example, the autonomous parking system 102 uses a communication protocol to establish or has previously established the mesh network 400 with one or more other vehicles (e.g., the vehicles 402 through 416) in the parking environment.

If a mesh network is not available, then the autonomous parking system 102 does not receive the summons request because the host vehicle 104 does not have a cellular connection. As a result, and in step 606, the driver must physically go to the host vehicle 104 and the summons request cannot be completed. To avoid this situation, the host vehicle 104 may initiate new mesh network connections to find another vehicle with a cellular connection to act as a proxy vehicle in response to a previous proxy vehicle disconnecting from the mesh network 400 or leaving the parking environment. In addition, a proxy vehicle may send an alert or signal to the host vehicle 104 and the other vehicles within the mesh network 400 if the proxy vehicle is about to exit the parking environment or otherwise disconnect from the mesh network 400.

In response to a mesh network being available and at step 608, the autonomous parking system 102 selects a proxy vehicle (e.g., the vehicle 416) among the vehicle 402 through 416 in the mesh network 400. As described above, the proxy vehicle has a cellular connection and can send and receive messages for the host vehicle (e.g., the summons request from the driver).

At optional step 610 and in response to receiving the summons request, the autonomous parking system 102 determines the battery level of the host vehicle 104. Step 610 assumes that the host vehicle 104 is an electric vehicle. However, a similar analysis and determination may be made by the autonomous parking system 102 of a non-electric vehicle in order to preserve the battery power of the host vehicle's (relatively smaller) battery. If the host vehicle 104 is not an electric vehicle, then the autonomous parking system 102 may proceed to step 616.

At optional step 612, the autonomous parking system 102 determines whether the battery level is low. At optional step 614 and in response to the battery level being low, the autonomous parking system 102 sends the location of the host vehicle 104 to the driver and instructs the driver to return to the host vehicle 104 (step 606) because the battery level is low. Autonomous operation of the host vehicle 104 may consume a significant amount of battery level and so the autonomous parking system 102 may decline the summons request to preserve the battery power.

At step 616, and in response to the battery level not being low, the autonomous parking system 102 autonomously operates the host vehicle 104 in the parking environment to complete the summons request. For example, the autonomous parking system 102 can navigate the host vehicle 104 to a location indicated in the summons request. In this way, the autonomous parking system 102 may carry out a summons request even without a cellular connection.

EXAMPLES

Example 1. A method comprising: obtaining, from a driver input to a host vehicle, a request to autonomously park the host vehicle in a parking environment; determining whether parking space information was obtained, the parking space information indicating an available space in the parking environment; in response to determining that the parking space information was obtained, autonomously operating the host vehicle in the parking environment to navigate to the available space; autonomously parking the host vehicle in the available space; determining whether a cellular connection is available to a communication system of the host vehicle; and in response to determining that the cellular connection is not available to the communication system of the host vehicle, communicating, via a proxy vehicle with the cellular connection, a location of the host vehicle to the driver.

Example 2. The method of Example 1, wherein the host vehicle communicates with the driver via the proxy vehicle using a mesh network.

Example 3. The method of Example 2, wherein the host vehicle uses a machine-learned algorithm to identify a shortest connection path between the host vehicle and the proxy vehicle within the mesh network.

Example 4. The method of Example 2 or 3, wherein the host vehicle and the proxy vehicle are manufactured by different manufacturers.

Example 5. The method of any one of Examples 2 through 4, wherein the mesh network is formed by: connecting, by the host vehicle, with a first other vehicle using a communication protocol; in response to determining that the first other vehicle has the cellular connection, identifying the first other vehicle as the proxy vehicle; or in response to determining that the first other vehicle does not have the cellular connection, connecting with a second other vehicle using the communication protocol, the connection with the second other vehicle being either direct or indirect via the first other vehicle; and in response to determining that the second other vehicle has the cellular connection, identifying the second other vehicle as the proxy vehicle.

Example 6. The method of Example 5, wherein the host vehicle, the proxy vehicle, the first other vehicle, and the second other vehicle communicate using at least one of a Bluetooth®, a wireless local area network, Dedicated Short Range Communication (DSRC), Vehicle-to-Vehicle (V2V), Zigbee, or Z-Wave communication protocol.

Example 7. The method of any one of Examples 2 through 6, wherein the method further comprises: in response to determining that the host vehicle is in a low-power battery condition, communicating a location of the host vehicle to the driver via the mesh network and disconnecting the host vehicle from the mesh network to conserve battery power.

Example 8. The method of any one of the previous Examples, wherein the method further comprises: after communicating the location of the host vehicle to the driver, obtaining, via the proxy vehicle or another proxy vehicle, a summons request from the driver to navigate the host vehicle from the available space to a pickup area in or near the parking environment; and in response to obtaining the summons request, autonomously operating the host vehicle from the available space to the pickup area.

Example 9. The method of Example 8, wherein the method further comprises: in response to obtaining the summons request and before autonomously operating the host vehicle from the available space to the pickup area, determining whether the host vehicle is in a low-power battery condition; and in response to determining that the host vehicle is in the low-power battery condition, communicating, via the proxy vehicle or the other proxy vehicle, the location to the driver to decline or reject the summons request.

Example 10. The method of any one of the previous Examples, wherein the request to autonomously park the host vehicle is received via driver input on a display in the host vehicle or via input by the driver on a mobile device.

Example 11. The method of any one of the previous Examples, wherein the parking space information is obtained from another vehicle or an infrastructure device in the parking environment.

Example 12. The method of any one of the previous Examples, wherein the method further comprises: in response to determining that the parking space information was not obtained, autonomously operating the host vehicle in the parking environment to identify the available space and obtain the parking space information.

Example 13. The method of any one of the previous Examples, wherein the parking environment is a parking garage.

Example 14. A system comprising: one or more processors configured to perform the method of any one of the previous Examples.

Example 15. A non-transitory computer-readable storage medium that stores computer-executable instructions that, when executed by a processor, cause the processor to perform the method of any one of Examples 1 through 13.

CONCLUSION

Although implementations of present disclosure have been described in language specific to certain features and/or methods, the subject of the appended claims is not necessarily limited to the specific features or methods described. Rather, the specific features and methods are disclosed as some example implementations. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
  obtaining, from a driver input to a host vehicle, a request to autonomously park the host vehicle in a parking environment;
  determining that parking space information was obtained, the parking space information indicating an available space in the parking environment;
  in response to determining that the parking space information was obtained, autonomously operating the host vehicle in the parking environment to navigate to the available space;
  autonomously parking the host vehicle in the available space;
  determining that a cellular connection is not available to a communication system of the host vehicle;
  in response to determining that the cellular connection is not available to the communication system of the host vehicle, communicating, via a proxy vehicle with the cellular connection, a location of the host vehicle to the driver;
  after communicating the location of the host vehicle to the driver, obtaining, via the proxy vehicle or another proxy vehicle, a summons request from the driver to navigate the host vehicle from the available space to a pickup area in or near the parking environment;
  in response to obtaining the summons request, autonomously operating the host vehicle from the available space to the pickup area;
  in response to obtaining the summons request and before autonomously operating the host vehicle from the available space to the pickup area, determining that the host vehicle is in a low-power battery condition; and
  in response to determining that the host vehicle is in the low-power battery condition, communicating, via the proxy vehicle or the other proxy vehicle, the location to the driver to decline or reject the summons request.

2. The method of claim 1, wherein the host vehicle communicates with the driver via the proxy vehicle using a mesh network.

3. The method of claim 2, wherein the host vehicle uses a machine-learned algorithm to identify a shortest connection path between the host vehicle and the proxy vehicle within the mesh network.

4. The method of claim 2, wherein the host vehicle and the proxy vehicle are manufactured by different manufacturers.

5. The method of claim 2, wherein the mesh network is formed by:
  connecting, by the host vehicle, with a first other vehicle using a communication protocol;
  in response to determining that the first other vehicle has the cellular connection, identifying the first other vehicle as the proxy vehicle;
  in response to determining that the first other vehicle does not have the cellular connection, connecting with a second other vehicle using the communication protocol, the connection with the second other vehicle being either direct or indirect via the first other vehicle; and
  in response to determining that the second other vehicle has the cellular connection, identifying the second other vehicle as the proxy vehicle.

6. The method of claim 5, wherein the host vehicle, the proxy vehicle, the first other vehicle, and the second other vehicle communicate using at least one of a wireless local area network, Dedicated Short Range Communication (DSRC), and Vehicle-to-Vehicle (V2V) communication.

7. The method of claim 2, wherein the method further comprises:
  communicating a location of the host vehicle to the driver via the mesh network and disconnecting the host vehicle from the mesh network to conserve battery power when the host vehicle is in the low-power battery condition.

8. The method of claim 1, wherein the request to autonomously park the host vehicle is received via driver input on a display in the host vehicle or via input by the driver on a mobile device.

9. The method of claim 1, wherein the parking space information is obtained from another vehicle or an infrastructure device in the parking environment.

10. A system comprising:
one or more processors configured to:
obtain, from a driver input to a host vehicle, a request to autonomously park the host vehicle in a parking environment;
determine whether parking space information was obtained, the parking space information indicating an available space in the parking environment;
in response to a determination that the parking space information was obtained, autonomously operate the host vehicle in the parking environment to navigate to the available space;
autonomously park the host vehicle in the available space;
determine whether a cellular connection is not available to a communication system of the host vehicle;
in response to a determination that the cellular connection is not available to the communication system of the host vehicle, communicate, via a proxy vehicle with the cellular connection, a location of the host vehicle to the driver;
after communicating the location of the host vehicle to the driver, obtain, via the proxy vehicle or another proxy vehicle, a summons request from the driver to navigate the host vehicle from the available space to a pickup area in or near the parking environment;
in response to obtaining the summons request, autonomously operate the host vehicle from the available space to the pickup area;
in response to obtaining the summons request and before autonomously operating the host vehicle from the available space to the pickup area, determine whether the host vehicle is in a low-power battery condition; and
in response to determining that the host vehicle is in the low-power battery condition, communicate, via the proxy vehicle or the other proxy vehicle, the location to the driver to decline or reject the summons request.

11. The system of claim 10, wherein the host vehicle communicates with the driver via the proxy vehicle using a mesh network.

12. The system of claim 11, wherein the one or more processors are further configured to use a machine-learned algorithm to identify a shortest connection path between the host vehicle and the proxy vehicle within the mesh network.

13. The system of claim 11, wherein the one or more processors are configured to form the mesh network by:
connecting with a first other vehicle using a communication protocol;
in response to determining that the first other vehicle has the cellular connection, identifying the first other vehicle as the proxy vehicle; or
in response to determining that the first other vehicle does not have the cellular connection, connecting with a second other vehicle using the communication protocol, the connection with the second other vehicle being either direct or indirect via the first other vehicle; and
in response to determining that the second other vehicle has the cellular connection, identifying the second other vehicle as the proxy vehicle.

14. The system of claim 10, wherein the one or more processors are further configured to:
in response to determining that parking space information was not obtained, autonomously operate the host vehicle in the parking environment to identify the available space and obtain the parking space information.

15. A non-transitory computer-readable storage medium that stores computer-executable instructions that, when executed by a processor, cause the processor to:
obtain, from a driver input to a host vehicle, a request to autonomously park the host vehicle in a parking environment;
determine whether parking space information was obtained, the parking space information indicating an available space in the parking environment;
in response to a determination that the parking space information was obtained, autonomously operate the host vehicle in the parking environment to navigate to the available space;
autonomously park the host vehicle in the available space;
determine whether a cellular connection is available to a communication system of the host vehicle;
in response to a determination that the cellular connection is not available to the communication system of the host vehicle, communicate, via a proxy vehicle with the cellular connection, a location of the host vehicle to the driver;
after communicating the location of the host vehicle to the driver, obtain, via the proxy vehicle or another proxy vehicle, a summons request from the driver to navigate the host vehicle from the available space to a pickup area in or near the parking environment;
in response to obtaining the summons request, autonomously operate the host vehicle from the available space to the pickup area;
in response to obtaining the summons request and before autonomously operating the host vehicle from the available space to the pickup area, determine whether the host vehicle is in a low-power battery condition; and
in response to determining that the host vehicle is in the low-power battery condition, communicate, via the proxy vehicle or the other proxy vehicle, the location to the driver to decline or reject the summons request.

* * * * *